United States Patent [19]

Jaccod

[11] Patent Number: 4,460,056

[45] Date of Patent: Jul. 17, 1984

[54] ENGINE-DRIVEN AUXILIARY SYSTEM FOR A MOTOR VEHICLE

[75] Inventor: Michel Jaccod, Champigny-sur-Marne, France

[73] Assignee: VALEO, Paris, France

[21] Appl. No.: 316,319

[22] Filed: Oct. 29, 1981

[30] Foreign Application Priority Data

Nov. 4, 1980 [FR] France .............................. 80 23507
Feb. 27, 1981 [EP] European Pat. Off. ........ 81400305.9

[51] Int. Cl.³ ............................................. B60K 25/00
[52] U.S. Cl. .............................. 180/53.7; 123/195 A; 123/198 R; 180/132
[58] Field of Search ........................ 180/53, 132, 79.1; 123/195 A, 198 C, 198 R; 290/50

[56] References Cited

U.S. PATENT DOCUMENTS

| | | | |
|---|---|---|---|
| 2,012,588 | 8/1935 | Logan | 290/50 |
| 2,754,465 | 7/1956 | Brier | 180/79.1 |
| 2,988,890 | 6/1961 | Oishei | 180/132 |
| 3,692,007 | 9/1972 | Nilssen | 123/195 A |
| 3,991,357 | 11/1976 | Kaminski | 290/50 |
| 4,144,946 | 3/1979 | Melocik | 180/132 |

FOREIGN PATENT DOCUMENTS

| | | |
|---|---|---|
| 2237166 | 7/1972 | Fed. Rep. of Germany ..... 180/79.1 |
| 2213303 | 9/1973 | Fed. Rep. of Germany . |
| 2173596 | 5/1973 | France . |
| 2281245 | 5/1976 | France . |
| 2366950 | 5/1978 | France . |

*Primary Examiner*—John A. Pekar
*Assistant Examiner*—D. Lynn Fugate
*Attorney, Agent, or Firm*—Young & Thompson

[57] ABSTRACT

The invention comprises an engine-driven auxiliary system for a motor vehicle. At least two auxiliaries are coupled in rotation with the crankshaft of the vehicle engine by transmission means. These auxiliaries include auxiliaries which constitute a hierarchic group with an order of operational priority in which at least one of the auxiliaries takes precedence over at least one other of the auxiliaries. The state of an economizer element varies concomitantly with the working conditions of the auxiliary having the higher priority, and is adapted to put the auxiliary with the lower priority at least partly out of action when the working conditions of the higher priority auxiliary exceed a predetermined threshold.

4 Claims, 19 Drawing Figures

FIG. 6
FIG. 7
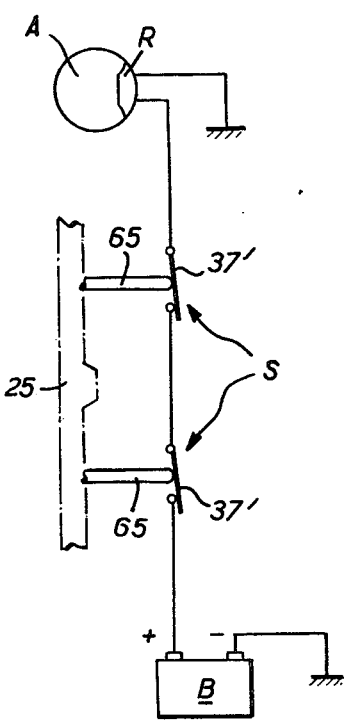
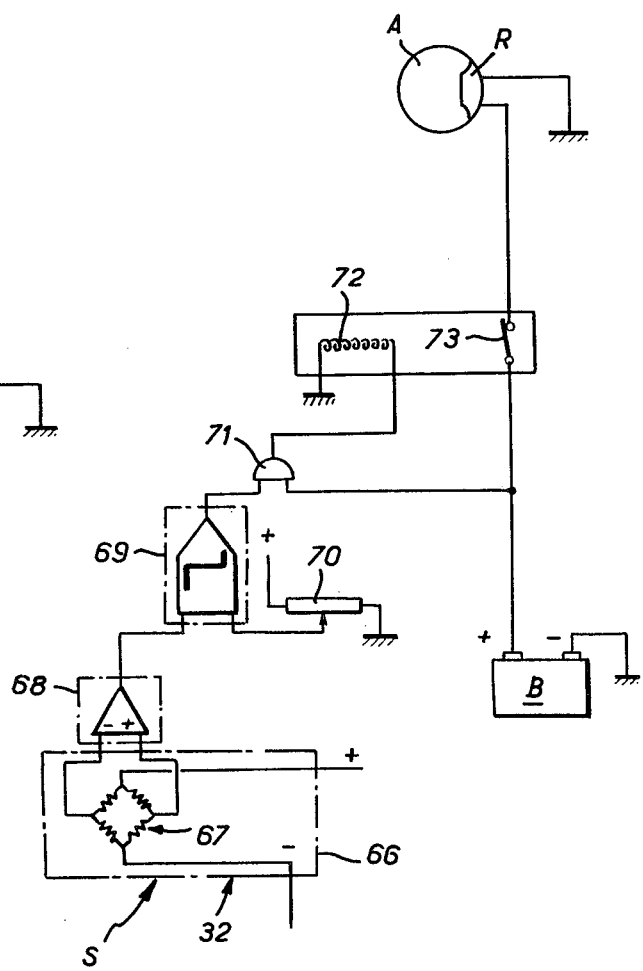

ENGINE-DRIVEN AUXILIARY SYSTEM FOR A MOTOR VEHICLE

BACKGROUND OF THE INVENTION

This invention relates to an engine-driven auxiliary system for a motor vehicle, comprising at least two auxiliaries coupled in rotation to the vehicle engine by transmission means.

Generally speaking, the axes of rotation of an engine and of its auxiliaries are parallel and spaced and the transmission means consist particularly of pulleys and one or more belts passing around these pulleys.

The transmission means may have a fixed ratio, but are advantageously provided with a variable transmission ratio, so that the auxiliaries turn in the range of rotational speeds which is most favourable to their efficiency, whatever the engine speed.

To this end, the variable ratio transmission means may be continuously variable and comprise pulleys which have flanges spaced apart variably and which receive a belt which is made to rise radially on a pulley of which the flanges are moving closer, at the same time as it is made to descend radially on the other pulley, of which the flanges move apart. The spacing of the flanges is controlled in any appropriate manner, e.g. as a function of the torque required by the auxiliaries which are driven by the transmission means, which makes it possible for the auxiliaries to operate in good conditions, but necessitates a complex construction, or again as a function of the engine speed or condition, which permits a relatively simple construction.

As a variant, the variable transmission means may be of discontinuously variable ratio, e.g. be of fixed ratio up to a certain engine speed, and then change ratio beyond that engine speed.

The auxiliaries coupled in rotation to the vehicle engine by the transmission means may be of various types. They include, e.g. an assistance pump. The latter may serve particularly for assistance to the steering and/or assistance to the braking, or again, in a more complex construction, form part of a hydraulic plant which not only serves to assist the steering and/or the braking, but also performs other functions, e.g. assists in the suspension of the vehicle. The auxiliaries may likewise include an engine air supercharge volumetric compressor, an alternator serving particularly to charge the vehicle battery, a vehicle air-conditioning compressor, an engine cooling fluid circulating pump, etc.

The inventor has observed that an auxiliary, such as e.g. the alternator, consumes energy in a substantially continuous and constant manner, whereas the consumption of energy by an auxiliary such as, e.g. an assistance pump, particularly the assisted-steering pump, exhibits occasional peaks of short duration during sharp changes of direction, e.g. during parking manoeuvres.

This results in an increased energy consumption at certain times and the need to over-dimension the transmission means, particularly with pulleys and belts, and/or to equip them to enable them to sustain the occasional torque maxima.

It is an object of the present invention to provide an engine-driven auxiliary system for a motor vehicle, of the above-indicated type, which permits not only an economy of energy consumption, but also a simplification of construction, a reduction in size and excellent efficiency.

SUMMARY

According to the invention, an auxiliary system driven by the engine of a motor vehicle comprises at least two auxiliaries coupled in rotation to the vehicle engine by transmission means, and is characterised in that the said auxiliaries include auxiliaries which constitute a hierarchic group with an order of priority in which at least one of the auxiliaries, the superior auxiliary, takes precedence over at least one other of the auxiliaries, that is the inferior auxiliary, and in that the device comprises an economiser element, the state of which varies concurrently with the working conditions of the superior auxiliary, and in that the said economiser element is adapted to be activated, putting the inferior auxiliary at least partly out of action, in response to a variation in the state of the said economiser element which corresponds to the exceeding of a predetermined threshold in the working conditions of the superior auxiliary, so that the said transmission means are subjected to work which corresponds at most to a value lower than the sum of the maximum power consumption of the said auxiliaries.

By virtue of this arrangement the peaks of energy consumption are eliminated, whilst giving the superior auxiliary absolute priority. Overall, the energy consumption is reduced and is more uniform. Moreover, the transmission means which couple the auxiliaries in rotation to the engine of the vehicle are subjected to alleviated working conditions and may be simplified and made less bulky. In particular, where the transmission means comprise pulleys, a reduced number of belts, or even a single belt, may be sufficient for the drive of the auxiliaries by the engine of the vehicle.

The present invention is applied with particular advantage to an auxiliary device driven by the engine of a motor vehicle where the transmission means which couple the auxiliaries in rotation to the vehicle engine are of variable transmission ratio and in particular comprise pulleys having variable-spaced cheeks or flanges.

In this case, by virtue of the alleviated working conditions to which the variable ratio transmission means are subjected, these transmission means may be produced with a particularly simple construction, by making the transmission ratio vary as a function of the engine speed or condition.

Thus, even if the transmission ratio is not directly linked to the torque required by the auxiliaries driven through the said transmission means, the various auxiliaries benefit from excellent working conditions, with high efficiency, whilst the transmission means may have a simplified construction, reduced dimensions, improved efficiency, and longer useful life, by virtue of a reduction in the maximum power to be transmitted and a reduction in the range of power to be transmitted. If appropriate, these advantages may be exploited by increasing the number of auxiliary units to be driven, for a given capacity of the variable-ratio transmission.

According to another characteristic, the variable ratio transmission means comprise a driving pulley associated with the engine, a driven pulley associated with one of the auxiliaries of the vehicle, at least one of these pulleys, and preferably both, having variably-spaced flanges or cheeks, a belt of variable transmission ratio passing round these pulleys, other pulleys associated with the other auxiliaries of the vehicle, and belt means of fixed transmission ratio passing around a pulley integral with the said driven pulley and round the said other pulleys.

The belt means of fixed transmission ratio may comprise a belt particular to each auxiliary, or preferably, a belt common to at least two auxiliaries, or again, still more advantageously, a belt common to all the auxiliaries.

Such a simplification is made possible by virtue of the alleviation of the working conditions of the transmission means.

The superior auxiliary may consist of an assistance pump or an engine air supercharge volumetric compressor, or an alternator.

The inferior auxiliary may be formed by the engine air supercharge volumetric compressor, by the alternator or again by the vehicle air-conditioning compressor.

The hierarchic auxiliary group may comprise either two auxiliaries, or three auxiliaries, or four auxiliaries, or still more. It should be observed that, where the hierarchic group comprises more than two auxiliaries, one auxiliary may be superior with reference to another auxiliary, whilst being inferior with reference to yet another auxiliary.

The economiser element may have any appropriate form according to the auxiliary with which it cooperates.

Where the economiser element cooperates with the assistance pump, it may particularly comprise a pressure switch. Where the assistance pump is an assisted-steering pump, the economiser element may likewise comprise circuit breaker means sensitive to the direction change condition of a rack of the assisted-steering system, or again circuit breaker means sensitive to the torque developed in a torsion bar of the assisted-steering system.

Where the superior auxiliary is an engine air supercharge volumetric compressor, the economiser element may particularly be activated as a function of the degree of depression of an accelerator pedal of the said engine.

Where the superior auxiliary is an alternator, the economiser element is particularly activated as a function of the voltage of the battery associated with the alternator.

It should be observed that, among the auxiliaries of the vehicle, there may be some which are not directly coupled in rotation by the transmission means to the vehicle engine, but which may be linked to such auxiliaries.

For example, where a vehicle air-conditioning evaporator fan is provided, it is advantageously adapted to be put into or out of action at the same time as the alternator is itself put into or out of action. Where a vehicle air-conditioning condenser fan is provided, it is advantageously adapted to be put into or out of action at the same time as the air-conditioning compressor is itself put into or out of action.

Where electric comfort auxiliaries, e.g. cigar lighter, rear window defroster, window-raiser, heater, etc. are provided, they are advantageously adapted to be put into or out of action, partly or totally, concurrently with the alternator.

Obviously, the transmission means which drive the auxiliaries which form part of the hierarchic group may at the same time drive auxiliaries which do not form part of that group, e.g. an engine cooling fluid circulating pump, such as a water pump, and likewise any other appropriate auxiliaries, e.g. an engine cooling fan, having a mechanical or viscous coupling to the water pump.

BRIEF DESCRIPTION OF THE DRAWINGS

FIGS. 6 and 7 relate respectively to two variants of the arrangement of the economiser element adapted to put the alternator out of action when the working conditions of the assisted-steering pump exceed a predetermined threshold;

DETAILED DESCRIPTION OF THE PREFERRED EMBODIMENTS

Figure 1:
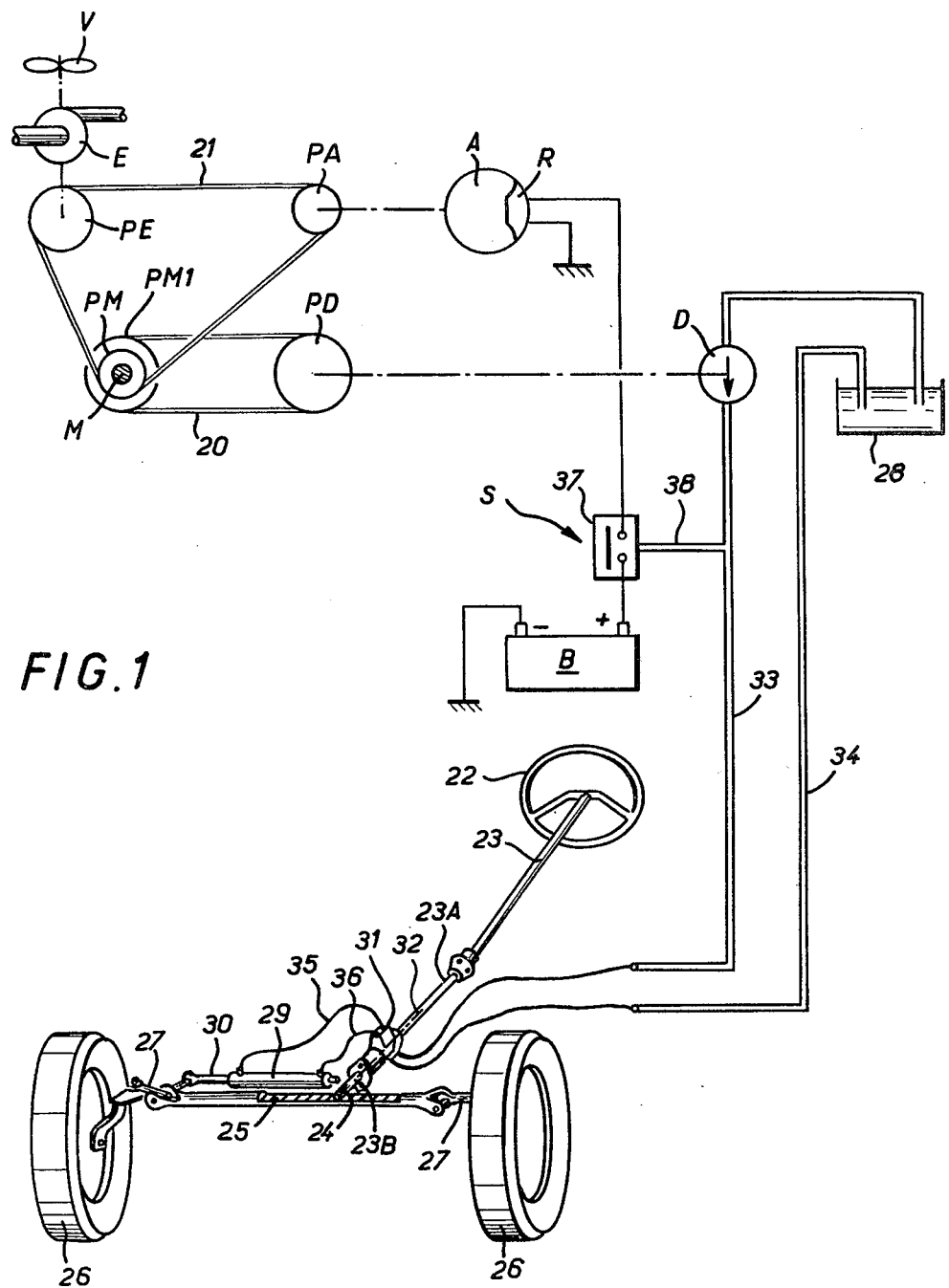
FIG. 1 is a diagram of an auxiliary system according to the invention, in which the vehicle engine drives an assisted-steering pump and an alternator, which constitute the hierarchic group, and also a water pump which does not form part of this hierarchic group, the transmission means being of fixed ratio.

Reference will be made first to FIG. 1 which shows, in a non-limitative example, an auxiliary system driven by the engine of a motor vehicle, the crankshaft of which is seen at M. This device comprises an assisted-steering pump D, an alternator A, the regulator of which is seen at R, and a cooling fluid circulating pump E of the said engine, such as a water pump E associated with a cooling fan V of a water circuit of the engine. The fan V may particularly be of the mechanical coupling or the viscous coupling type.

The assisted-steering pump D may either serve solely to assist the steering system, or else in a more complex manner form part of a hydraulic plant which not only serves to assist the steering system but also performs other functions, e.g. assistance to the braking and/or the suspension of the vehicle.

The assisted-steering pump D, the alternator A and the water pump E, with possibly the fan V, are respectively integral in rotation with three pulleys PD, PA and PE. Two other pulleys PM and PM1 are integral in rotation with the crankshaft M of the vehicle engine. The axes of the crankshaft M and the pulleys PD, PA, PE are parallel and spaced. The pulleys PM and PM1 may have different diameters, as shown, or may have the same diameter, and e.g. be formed by one pulley with two grooves. The driving pulley PM drives the pulley PD of the assisted-steering pump D by a trapezoidal belt 20. The driving pulley PM1 drives the pulley PA of the alternator A and the pulley PE of the water pump E by a trapezoidal belt 21.

The steering system comprises a steering wheel 22 and a steering column 23. The latter is composed of two aligned parts 23A and 23B capable of limited angular displacement by the action of the steering wheel 22. The part 23A is integral with the steering wheel 22, whereas the part 23B is integral with a pinion 24 which meshes with a rack 25. The latter controls the orientation of the steered wheels 26 of the vehicle via steering arms 27.

A hydraulic assistance plant 28-D comprises a tank 28 and the pump D which draws from this tank. A hydraulic actuator consists of a jack 29 with a piston, the rod 30 of which acts upon the rack 25.

A hydraulic distributor 31 is interposed between the plant 28-D and the jack 29 and is sensitive to the angular offset of the two parts 23A and 23B, in order to make the jack 29 act upon the steering arms 27 in the same direction as the steering wheel 22.

The angular play between the parts 23A and 23B of the steering column 23 amounts to a few degrees on each side of a mean rest position, which tends to be restored and maintained by a torsion bar 32 elastically coupling the parts 23A and 23B.

33 shows the delivery pipe which feeds the distributor 31 from the pump D, and 34 shows the return pipe from the distributor 31 to the tank 28. Also, 35 and 36 show the service pipes which connect the distributor 31 to the two sides of the jack 29.

The auxiliaries D, A and E are thus coupled in rotation to the vehicle engine by the transmission means PM, PM1, PD, PA, PE, 20 and 21. The auxiliaries D, A and E include auxiliaries D and A which constitute a hierarchic group of two auxiliaries with an order of priority where the auxiliary D, called the primary superior auxiliary, occupies a higher rank than the auxiliary A, called the secondary inferior auxiliary.

An economiser element S is provided. The state of this economiser element S varies concomitantly with the working conditions of the primary superior auxiliary D.

The economiser element S is adapted to be activated, putting the secondary inferior auxiliary A at least partly out of action, in response to a variation in the state of the economiser element S which corresponds to the exceeding of a predetermined threshold in the working conditions of the primary superior auxiliary D, so that the transmission means PM, PM1, PD, PA, PE, 20 and 21 are, altogether, subjected to work which corresponds at most to a value lower than the sum of the maximum power consumption of the auxiliaries.

The economiser element S provided is directly sensitive to the working conditions of the assisted-steering pump D, so as to put the alternator A out of action when the working conditions of the assisted steering pump D exceed the said predetermined threshold.

The economiser element S is adapted to cut off the electricity supply to the regulator R of the alternator A. The element S consists e.g. of a mano-contact or pressure switch 37 connected by a pipe 38 to the delivery pipe 33 of the assisted-steering pump D. This pressure switch 37 is interposed between the battery B of the vehicle and the regulator R of the alternator A.

The pressure switch 37 is calibrated so as to permit the supply to the regulator R by the battery B so long as the pressure in the pipe 33 is below a predetermined pressure threshold, e.g. 15 bars, and to cut off the supply to the regulator R when the pressure in the pipe 33 exceeds this predetermined threshold.

In operation, so long as the pressure in the pipe 33 is below the predetermined threshold, which corresponds particularly to steering conditions other than those of parking manoeuvres, the assisted-steering pump D, the alternator A and the pump E all consume energy which is transmitted to them by the crankshaft M, through the transmission means PM, PM1, PD, PA, PE, 20, 21, but this consumption is on the whole moderate and uniform because the assisted-steering pump is subjected only to moderate working conditions.

On the other hand, in the case of a sharp change of direction, particularly at low speed, e.g. in the course of a parking manoeuvre generally of short duration, the pressure in the pipe 33 exceeds the predetermined threshold and this has the effect of putting the alternator A out of action. The assisted-steering pump D consumes more energy, but the alternator A is no longer permitted to expend energy on this occasion. This results overall in an energy consumption which remains moderate and uniform. The transmission means PM, PM1, PD, PA, PE, 20 and 21 are subjected to work which corresponds at most to a value lower than the sum of the maximum power consumption of the auxiliaries D, A and E.

The arrangement according to the invention therefore has the effect on the one hand of reducing the instantaenous energy consumption by distributing it over a period of time, and on the other hand of avoiding overdimensioning the transmission means PM, PM1, PD, PA, PE, 20 and 21.

Figure 2:
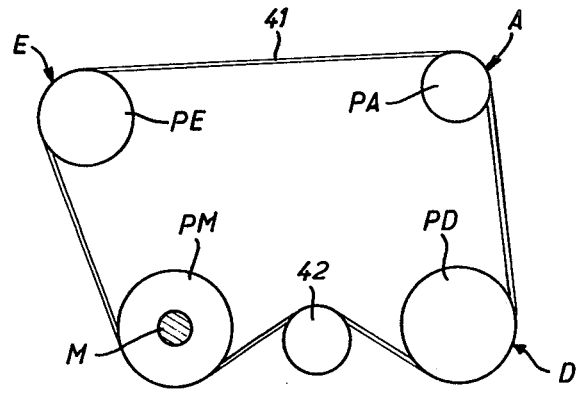
FIG. 2 relates to a variant of these drive means of fixed ratio.

Such a property is advantageously exploited by a simplification, a reduction in dimensions, and better efficiency of the drive device of the pulleys PA, PD and PE from the crankshaft M, as is illustrated in FIG. 2, to which reference will now be made.

In this case, the pulleys PM and PM1 are replaced by a single pulley PM integral in rotation with the crankshaft M, and the trapezoidal belts 20 and 21 are replaced by a single trapezoidal belt 41 which passes round the pulleys PD, PA, PE and PM and round a tension roller 42.

It will be appreciated that the construction according to the variant of FIG. 2 for the driving of the pulleys PA, PD and PE is simplified and has reduced dimensions, particularly the axial dimension since the pulley PM has a single groove instead of two grooves as in the assembly PM-PM1.

In another variant (FIGS. 3 and 4), the driving pulley PM' of the crankshaft M drives the driven pulley PE' of the water pump E by a trapezoidal belt 43 of variable transmission ratio. In this case, at least one of the pulleys PM' and PE', and preferably both pulleys PM' and PE', have variable-spaced conical cheeks.

Figure 3:
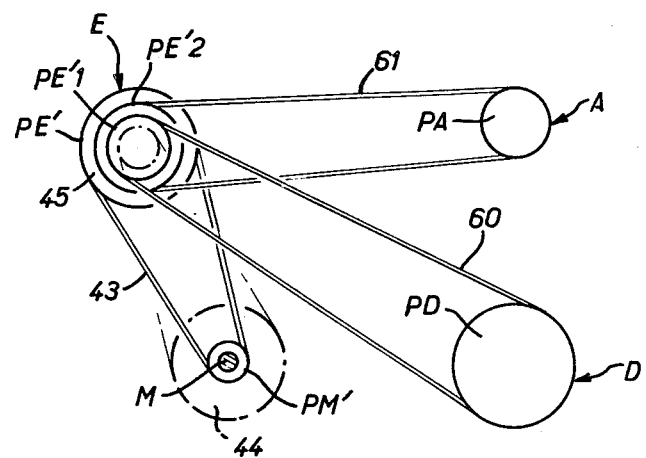
FIG. 3 relates to another variant in which the drive means are of variable transmission ratio and comprise two pulleys with variable-spaced flanges and a belt.

More particularly, the conical flanges 44 of the pulley PM' can be moved axially towards and away from each other, and the same applies to the conical flanges 45 of the pulley PE'. By the play of approach and withdrawal of the conical flanges 44 and 45 of the pulleys PM' and PE', the trapezoidal belt 43 rises or descends along the radius of the pulleys, which causes the transmission ratio to vary. FIG. 3 shows in solid lines the position which corresponds to the highest step-down ratio, and in chain-dotted lines the position which corresponds to the highest step-up ratio.

As a general guide, the variator PM'-43-PE' is advantageously controlled as a function of the engine speed so as to introduce a step-up ratio of the order of 1.3 when the engine speed is between 600 and 1200 rpm, to introduce a progressively decreasing ratio when the engine speed varies from 1200 to 2500 rpm, and to introduce a step-down ratio of the order of 0.6 when the engine speed is higher than 2500 rpm.

Figure 4:
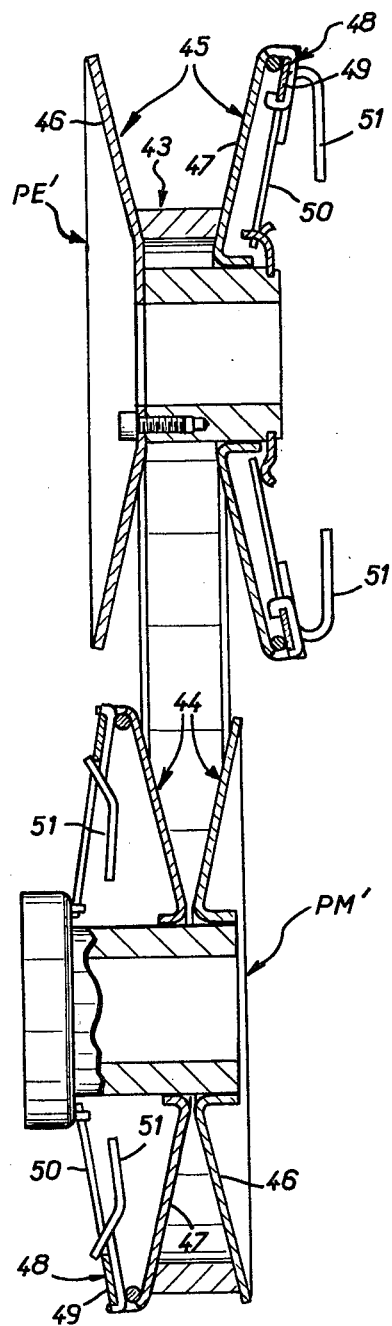
FIG. 4 is a view on a larger scale of these pulleys and this belt.

FIG. 4 shows more particularly a mode of construction of the pulleys PM' and PE' with variable-spaced flanges 44 and 45. The flanges 44 of the pulley PM' comprise an axially fixed flange 46 and an axially mobile flange 47. The axially mobile flange 47 is subject to the action of a spring 48 which tends to move it axially towards the axially fixed flange 46. The spring 48 is constituted by a conical diaphragm with a continuous peripheral part 49 forming a spring washer and extended towards the centre by spaced radial tongues 50. The diaphragm 48 is adapted to make the two flanges 46 and 47 integral in rotation. The axially mobile flange 47 is also subject to the action of weights 51 which are fastened to the diaphragm 48 and which tend to relieve the elastic axial action exerted by the diaphragm 48 upon the flange 47, and hence upon the belt 43, increasingly as the rotational speed of the pulley PM' is raised.

The construction of the pulley PE' is similar to that which has just been described for the pulley PM' and 46 shows again the axially fixed one of the two flanges 45, and at 47 the one which is axially mobile, at 48 the diaphragm and at 51 the weights. However, the diaphragm 48 of the pulley PE' which tends to move the two flanges 45 towards each other has its elastic axial action reinforced by the weights 51 increasingly as the speed of rotation of the pulley PE' is raised.

Under these conditions, when the pulley PM' is turning with a low engine speed, the belt 43 occupies the position shown in FIG. 4, i.e. with a large radius on the pulley PM' and a small radius on the pulley PE'. A step-up ratio applies. When the driving pulley PM' turns with a high engine speed, the belt 43 descends radially on the pulley PM' and rises radially on the pulley PE'. A step-down ratio applies. The particularly simple and space-saving construction of these pulleys PM' and PE' of variable transmission ratio as a function of the engine speed will be appreciated.

The pulley PD of the assisted-steering pump D is driven by a belt 60 from a pulley PE'1 integral in rotation with the pulley PE' of the water pump E, whilst the pulley PA of the alternator A is driven by a belt 61 from a pulley PE'2 integral in rotation with the pulleys PE' and PE'1. In the example of FIG. 3 the pulleys PE'1 and PE'2 are shown with different diameters, but they may have the same diameter and e.g. be formed by a pulley with two grooves.

In such a variable transmission device, the operating conditions are improved as before, the dimensions are reduced and the efficiency is higher, by virtue of the alternator A being put out of action at the time of sharp direction changes when the consumption of the assisted-steering pump D shows a consumption peak.

It will also be observed that the axial forces upon the belt are reduced and that its useful life is thus prolonged.

Figure 5:
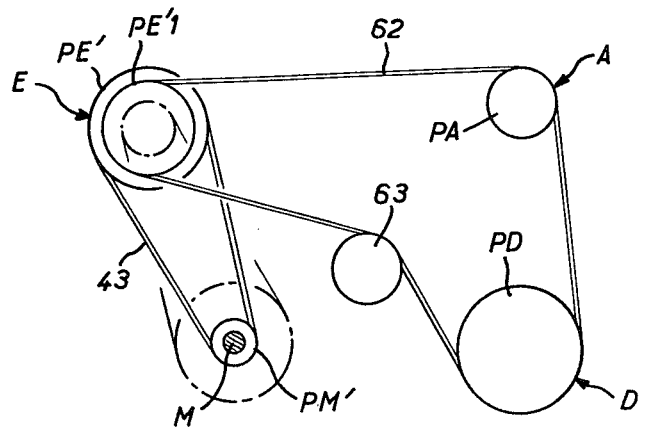
FIG. 5 is a view similar to FIG. 3, but relates to another variant.

Furthermore, the arrangement of FIG. 3 can advantageously be simplified as shown in FIG. 5, to which reference will now be made. The crankshaft M still drives the pulley PE' of the water pump E by the trapezoidal belt 43 of variable transmission ratio, but the pulley PE'2 is eliminated and the pulley PD of the assisted steering pump D and the pulley PA of the alternator A are both driven by a single trapezoidal belt 62 from the pulley PE'1 integral in rotation with the pulley PE'. The belt 62 passes not only round the pulleys PD, PA and PE'1 but also round a tension roller 63.

As a general guide, the arrangement according to the invention shown in FIG. 5 makes it possible to improve the efficiency of the variator PM'-43-PE', by reducing by about 50 % the critical value of the torque transmissible by this variator compared to a customary auxiliary with three units A, D and E.

It is likewise possible by virtue of the invention, for a given capacity of the variable transmission, to provide for the driving of one or more additional auxiliaries.

In the example of FIG. 1, the economiser element S which puts the alternator A out of action during sharp direction changes, consists of the pressure switch 37 which is subordinated to the pressure in the delivery pipe 33 of the assisted-steering pump D.

As a variant (FIG. 6) the economiser element S comprises mini-circuit breaker means 37' which are sensitive to the direction changes of the rack 25 of the assisted-steering system.

To this end, the mini-circuit breakers 37' are associated with push-buttons 65 which are actuated when the rack 25 exceeds a predetermined position in one or the other direction, corresponding to sharp changes of direction equivalent e.g. to the aforesaid pressure of 15 bars in the delivery pipe 33.

In another variant (FIG. 7) the economiser element S comprises a torque pick-up 66 with a Wheatstone bridge 67 and is fitted to the steering column 23, e.g. to the torsion bar 32. The pick-up 66 is supplied by the battery B. When the vehicle is in service, the steering column 23 undergoes a torsional force which is expressed at the pick-up 66 as a deformation of the resistances of the Wheatstone bridge 67. A variation in the voltage at the output of the bridge 67 corresponds to this deformation. The voltage is processed by an amplifier 68 and compared at 69 with a preferably adjustable reference voltage 70. When the voltage originating from the Wheatstone bridge 67 is higher than the reference voltage at 70, an impulse is generated which permits, at the output of an "AND-gate" 71, the excitation of a relay 72 which cuts off at 73 the supply to the regulator R of the alternator A. The other input of the gate 71 is fed by the battery B.

Here again, therefore, the alternator A is put out of action when the torque upon the torsion bar 32 exceeds a value which corresponds, e.g. substantially to the pressure of 15 bars in the delivery pipe 33 of the pump D.

Figure 8:
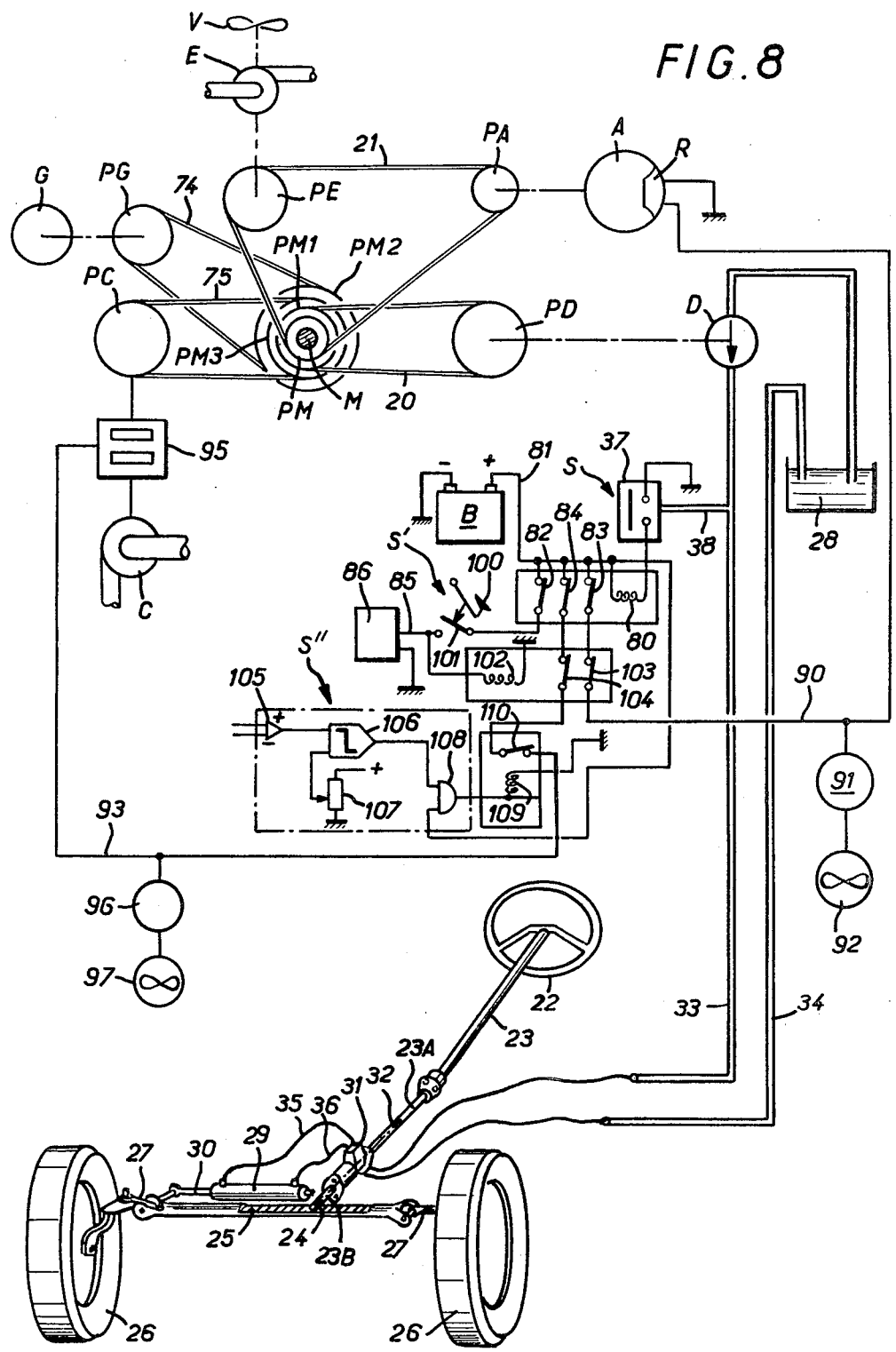
FIG. 8 is a diagram similar to that of FIG. 1, but in which the vehicle engine drives not only the assisted-steering pump, the alternator and the water pump, but also an engine air supercharge compressor and a vehicle air-conditioning compressor.

Reference will now be made to FIG. 8, where the arrangement is similar to that which has been described with reference to FIG. 1, but where the auxiliaries include not only the assisted steering pump D, the alternator A and the water pump E, but also an air-conditioning compressor C and an engine air supercharge volumetric compressor G.

The volumetric compressor G makes it possible to direct a pressurised pulsatory flow of air to the engine, which has the effect of supercharging the engine with air and improving its performance characteristics.

The compressor C forms part of a vehicle air-conditioning plant which also comprises an evaporator fan 92 and a condenser fan 97. The compressor C delivers energy to a cold source in order to generate heat loss.

The evaporator fan 92 blows cool air into the interior of the vehicle cabin.

PD, PA and PE show again the pulleys which are associated with the assisted-steering pump D, with the alternator A and with the water pump E, and which are driven by the pulleys PM and PM1 of the crankshaft M by means of the trapezoidal belts 20 and 21.

A pulley PG is associated with the engine air supercharge volumetric compressor G and is driven by a pulley PM2 of the crankshaft M by means of a trapezoidal belt 74. The air-conditioning compressor C is associated with the pulley PC which is driven by a pulley PM3 of the crankshaft M by means of a trapezoidal belt 75.

In FIG. 8, the auxiliaries which constitute the hierarchic group according to the invention include four auxiliaries, where a first of these auxiliaries, called the primary auxiliary, formed here by the assisted steering pump D, occupies a higher rank than a second of these auxiliaries, called the secondary auxiliary, formed by the engine air supercharge volumetric compressor G; this occupies a higher rank than a third of these auxiliaries, called the tertiary auxiliary, formed by the alternator A, which in turn occupies a higher rank than a fourth of these auxiliaries, called the quaternary auxiliary, formed by the air conditioning compressor C.

The four pulleys PM, PM1, PM2 and PM3 are shown with different diameters in FIG. 8, but may have the same diameter or be formed by a single pulley with four grooves.

As in FIG. 1, the state of the economiser element S varies concomitantly with the working conditions of the primary auxiliary formed by the assisted steering pump D. In FIG. 8, however, the economiser element S is adapted to be activated during sharp direction changes, especially at low speed, e.g. during a parking manoeuvre, in order to put out of action simultaneously the secondary auxiliary formed by the engine air supercharge volumetric compressor G, the tertiary auxiliary formed by the alternator A, and the quaternary auxiliary formed by the vehicle air-conditioning compressor C.

The economiser element S consists, e.g. as in FIG. 1, of the pressure switch 37 subordinated to the pressure in the delivery pipe 33 of the assisted steering pump D.

The pressure switch 37 acts upon a relay coil 80 which is supplied by the circuit 81 of the battery B and which controls three switches 82, 83 and 84.

Figure 9:
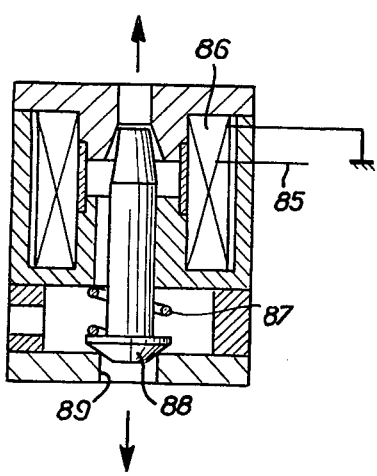
FIGS. 9 and 10 are respectively detailed views of two parts of FIG. 8.

The switch 82 is interposed between the circuit 81 of the battery B and a conductor 85 which supplies a coil 86 (FIGS. 8 and 9). The latter is adapted to control, counter to the action of a spring 87, a closure valve 88 of an air passage 89 (FIG. 9) for the air delivered to the air supercharge volumetric compressor G of the engine.

The switch 83 is interposed between the circuit 81 of the battery B and a conductor 90 which supplies the regulator R of the alternator A. An electric drive motor 91 of the vehicle air-conditioning evaporator fan 92 is connected to the conductor 90.

The switch 84 is interposed between the circuit 81 of the battery B and a conductor 93 which supplies the coil 94 of a solenoid clutch 95 (FIGS. 8 and 10) which is interposed between the vehicle air-conditioning compressor C and the pulley PC.

It should be observed that a solenoid clutch such as the clutch 95 (FIG. 10) may be used to put the volumetric compressor G out of action through lack of rotational drive, instead of the solenoid valve 86, which acts by closing the air supply (FIG. 8).

Similarly a solenoid valve, such as the solenoid valve 86, may be provided instead of the solenoid clutch 95 to shunt the evaporator and the condenser of the air-conditioning plant, which has the effect of cancelling the head losses to which the compressor C is subject and thus to reduce the energy required by the compressor C.

An electric drive motor 96 of the fan 97 of the vehicle air-conditioning condenser is connected to the conductor 93.

So long as the pressure in the delivery pipe 33 of the assisted-steering pump D does not exceed the predetermined threshold, the pressure switch 37 determines the closing of the switches 82, 83 and 84. The economiser element S does not prevent the other auxiliaries G, A and C from performing their function, likewise the fans 92 and 97, if there is no other obstacle.

At the time of a sharp direction change, the pressure in the pipe 33 exceeds the predetermined threshold and the pressure switch 37 causes the opening of the switches 82, 83 and 84. All the auxiliaries G, A and C are put out of action, likewise the fans 92 and 97.

Another economiser element S' is provided, the state of which varies concomitantly with the working conditions of the secondary auxiliary formed by the engine air supercharge volumetric compressor G. The economiser element S' is activated when the engine accelerator pedal 100 exceeds a predetermined degree of depression, which corresponds to a strong supercharge of air to the engine.

The element S' may be subordinated directly to the pedal 100 or to the intake butterfly valve, or to a linkage between this pedal and this butterfly valve, or again to any other equivalent factor, e.g. the degree of vacuum downstream of the butterfly valve.

The economiser element S' consists e.g. of a switch 101 which is controlled by the pedal 100 and which is interposed between the switch 82 and the supply conductor 85 of the solenoid valve 86. A relay 102 which controls two switches 103 and 104 is connected to the conductor 85 downstream of the switch 101.

The switch 103 is connected to the supply conductor 90 of the regulator R of the alternator A and the motor 91 of the vehicle air-conditioning evaporator fan 92.

The switch 104 is connected indirectly to the supply conductor 93 of the solenoid clutch of the vehicle air-conditioning compressor C via a switch 110.

When the pump D does not exceed its predetermined working threshold, and so long as the accelerator pedal 100 does not exceed its predetermined degree of depression, the switches 103 and 104 are closed. The economiser element S' does not prevent the other auxiliaries A and C from performing their functions, likewise the fans 92 and 97, if there is no other obstacle.

If the accelerator pedal 100 exceeds its predetermined degree of depression, which corresponds to a strong supercharge of air to the engine, the switches 103 and 104 open. The auxiliaries A and C are put out of action, likewise the fans 92 and 97.

Yet another economiser element S" is provided, the state of which varies concomitantly with the working conditions of the alternator A. The economiser element S" is activated when the battery B is not charged sufficiently by the alternator A and its voltage falls below a predetermined value.

The voltage of the battery B is processed by an amplifier 105 then compared at 106 with a preferably adjustable reference voltage 107. When the voltage supplied by the battery is below the reference voltage at 107, an impulse is generated which permits a relay 109 to be excited at the output of an "AND-gate" 108. This relay controls the switch 110 connected to the supply conductor 93 of the solenoid clutch 95 of the vehicle air-conditioning compressor C. The other input of the gate 108 is connected to the conductor 81.

When the working conditions of the auxiliaries D and G are not heavy, and so long as the voltage of the battery B is sufficiently high, which assumes relatively light working conditions of the alternator A, the switch 110 is closed. The economiser element S" does not prevent the auxiliary C from performing its function, likewise the fan 97.

If the voltage of the battery B falls below its predetermined value, which assumes heavy working conditions for the alternator A, the switch 110 opens. The auxiliary C is put out of action, likewise the fan 97.

In other words, the device according to the diagram of FIG. 8 functions in the following way.

When the pressure of the assisted-steering pump D exceeds the predetermined value, the auxiliaries, engine air supercharge volumetric compressor G, alternator A and air-conditioning plant C, no longer perform their functions.

When the pressure of the assisted-steering pump D is below its predetermined value, the engine air supercharge volumetric compressor G auxiliary receives priority over the other auxiliaries, i.e. the alternator A and the air-conditioning plant C.

If the two auxiliaries, assisted-steering pump D and engine air supercharge volumetric compressor G, do not exceed the predetermined values, the alternator A and the air-conditioning plant C can work normally, but if the voltage of the battery B falls below a predetermined threshold, stoppage of the air-conditioning plant C occurs.

Figure 10:
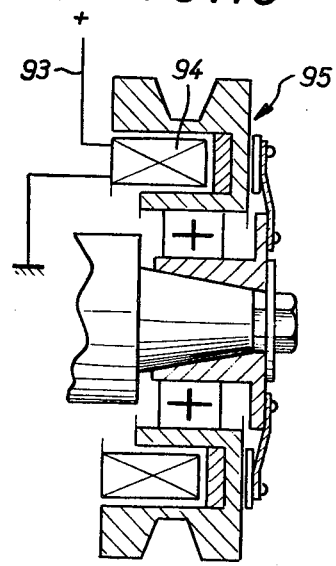

As a variant (FIG. 11), the arrangement is similar to that which has just been described with reference to FIGS. 8 to 10, but, when the pump D does not exceed its predetermined work threshold and the volumetric compressor G becomes the superior auxiliary with reference to the alternator A, this alternator A is adapted to be put out of action by the economiser element S' only if the current delivered by the alternator A is above a predetermined value.

To this end, a shunt 120 is fitted between the battery B and the alternator A, and the corresponding voltage is processed by an amplifier 121, then compared at 122 with a preferably adjustable reference voltage 123. When the voltage is higher than the reference voltage, an impulse is generated which permits the excitation, at the output of an "AND"-gate 124, of a relay 125 which controls a switch 126 interposed in the supply conductor 90 of the regulator R of the alternator A. The other input of the gate 124 is connected at 127 to the conductor 81 via the switch 103.

If the size of the current delivered by the alternator A is above a predetermined value, the operation is similar to that which was described with reference to FIGS. 8 to 10, but if the size of the current delivered by the alternator A is below this predetermined value, the regulator R of the alternator remains supplied, which permits the alternator to recharge the battery under all circumstances.

Figure 11:
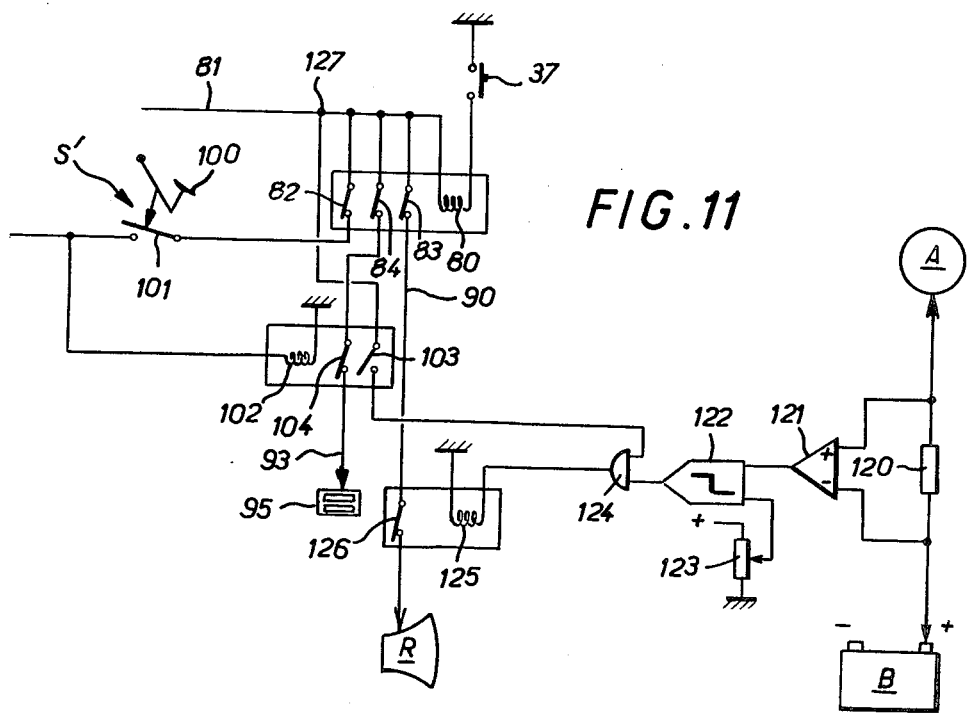
FIG. 11 is a view of a modified part of the diagram of FIG. 8, in which the alternator is adapted to be put partly out of action, namely only if the current delivered by this alternator is above a predetermined value.

In FIG. 11, therefore, the alternator A is adapted to be put at least partly out of action.

In FIG. 8, each auxiliary which forms part of the hierarchic group of auxiliaries, i.e. the assisted-steering pump D, the engine air supercharge volumetric compressor G, the alternator A and the air-conditioning compressor C, is driven from the engine by a belt particular to that auxiliary, i.e. the belt 20 for D, the belt 74 for G, the belt 21 for A (the belt 21 also drives the water pump E) and the belt 75 for C.

Figure 12:
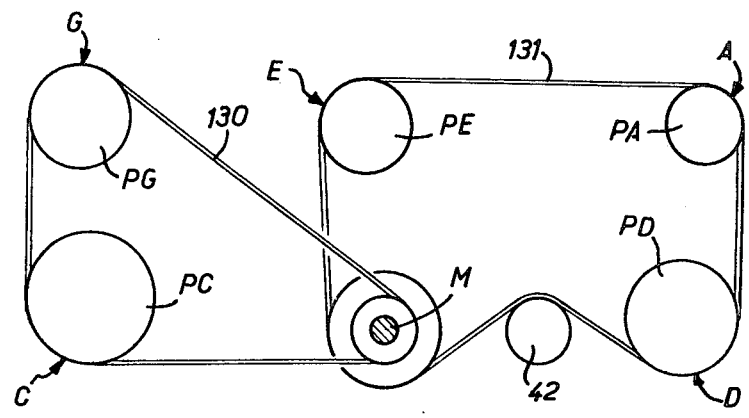
FIGS. 12, 13, 14, 15, 16, 17, 18 and 19 relate respectively to eight variants of the transmission means shown in FIG. 8.

In the variant illustrated in FIG. 12, the belt means comprise, for the auxiliaries G and C, a belt 130 common to both these auxiliaries, and for the auxiliaries D and A, a belt 131 common to these auxiliaries and which also drives the water pump E, according to an arrangement similar to that of FIG. 2 and comprising a tension roller 42.

Figure 13:
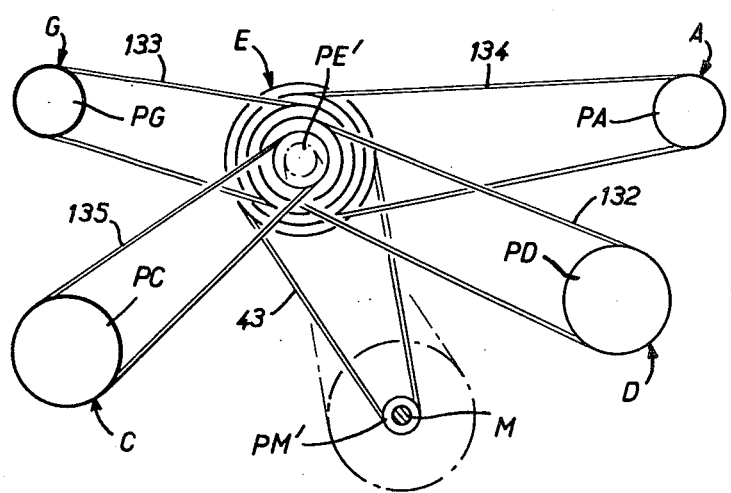

In the variant illustrated in FIG. 13, the transmission means are of variable ratio and comprise, as in FIG. 3, a driving pulley PM' and a driven pulley PE', at least one of which, and preferably both, have variably-spaced flanges, with the belt 43 of variable transmission ratio. The pulley PE' drives the water pump E and, also, by means of individual belts 132, 133, 134 and 135 respectively particular to the various auxiliaries, drives the assisted-steering pump D, the engine air supercharge volumetric compressor G, the alternator A and the air-conditioning compressor C.

In FIG. 13 the various auxiliaries C, G, A, D are distributed on either side of the plane passing through the axes of the pulleys PM' and PE'.

Figure 14:
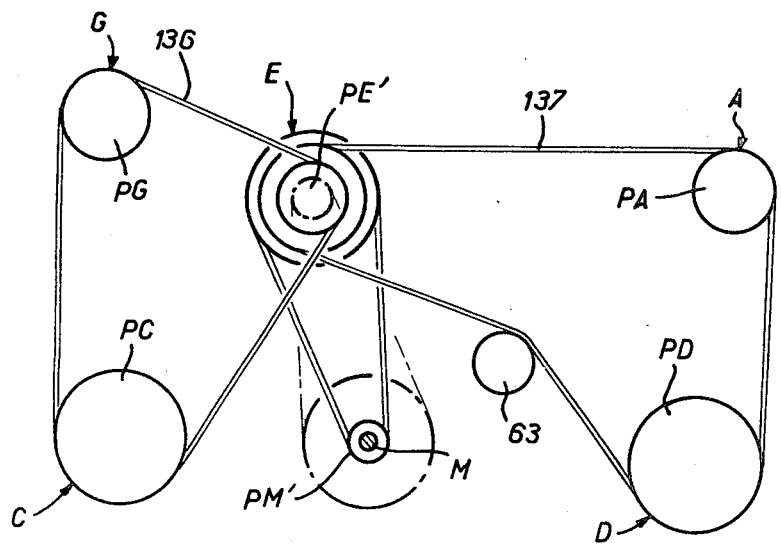

In FIG. 14 the arrangement is similar to that illustrated in FIG. 13, but the pulley PE' of the water pump E drives the auxiliaries G and C through a common belt 136, and the auxiliaries D and A through a common belt 137, according to an arrangement similar to that of FIG. 5 and comprising a tension roller 63.

In another variant (FIG. 15), there is a single belt 138 which, from the engine M, drives all the auxiliaries which form part of the hierarchic group, i.e. the auxiliaries D, G, A, C and also the water pump E. The tension rollers are visible at 139 and 140.

Figure 16:
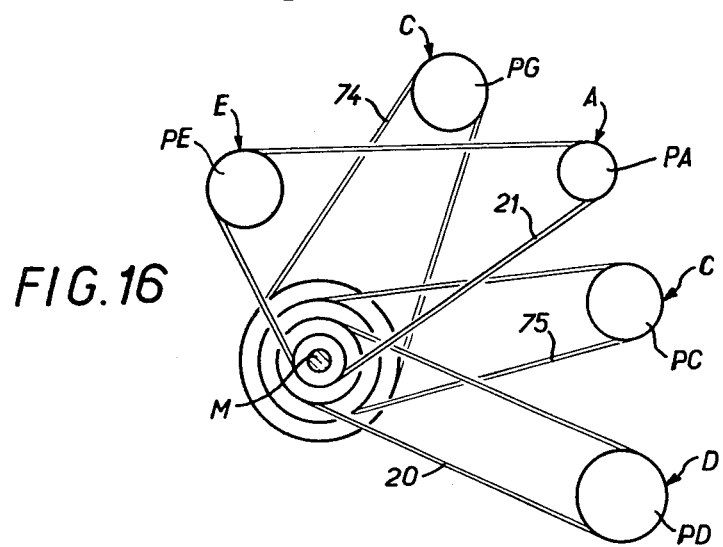

In FIG. 16 the arrangement is similar to that which is illustrated in FIG. 8. The auxiliary D is driven from the engine through a belt 20. The auxiliary G is driven from the engine through a belt 74. The alternator A and the water pump E are driven from the engine through a belt 21, and the air-conditioning compressor C is driven from the engine through a belt 75, but the arrangement of the various pulleys PD, PC, PA, PG and PE is different from that shown in FIG. 8. In FIG. 8, the auxiliaries are arranged round the engine shaft M in the following order: C, G, E, A, D. In FIG. 16, this order is different and is E, G, A, C, D.

Figure 15:
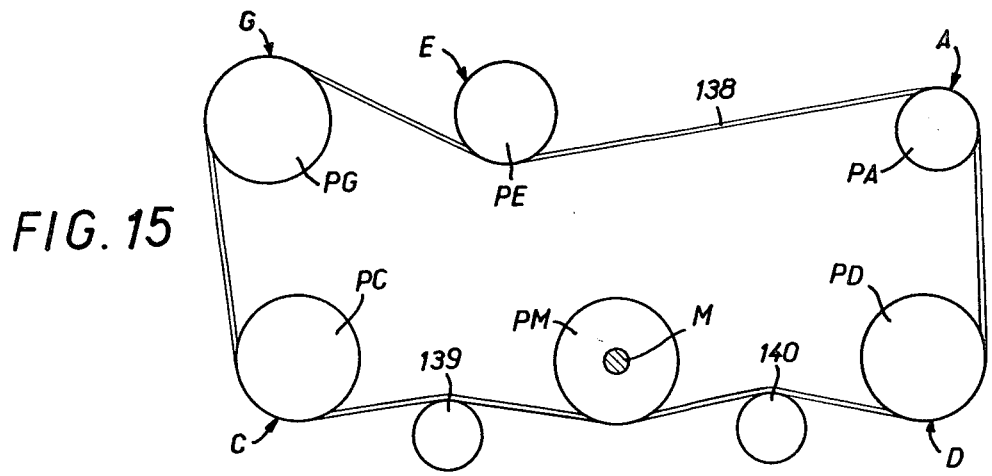
Figure 17:
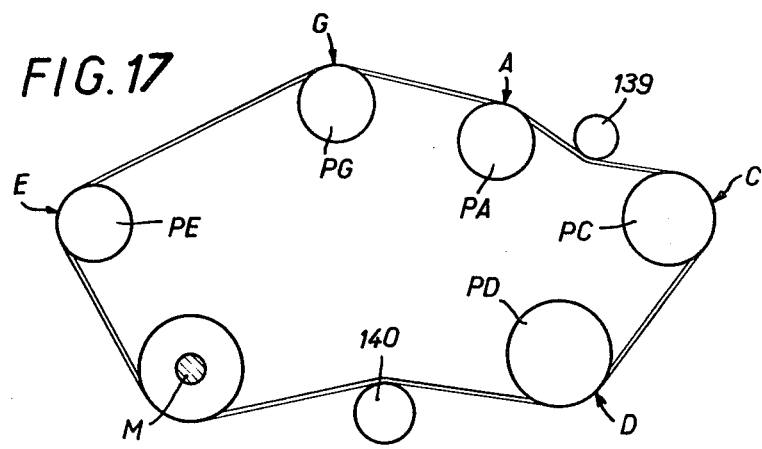

In the variant illustrated in FIG. 17, the arrangements is similar to that which is illustrated in FIG. 15, but the auxiliaries are arranged in a different way. In FIG. 15 the auxiliaries are arranged round the engine M in the following order C, G, E, A, D. In FIG. 17, this order is different and is: E, G, A, C, D.

Figure 18:
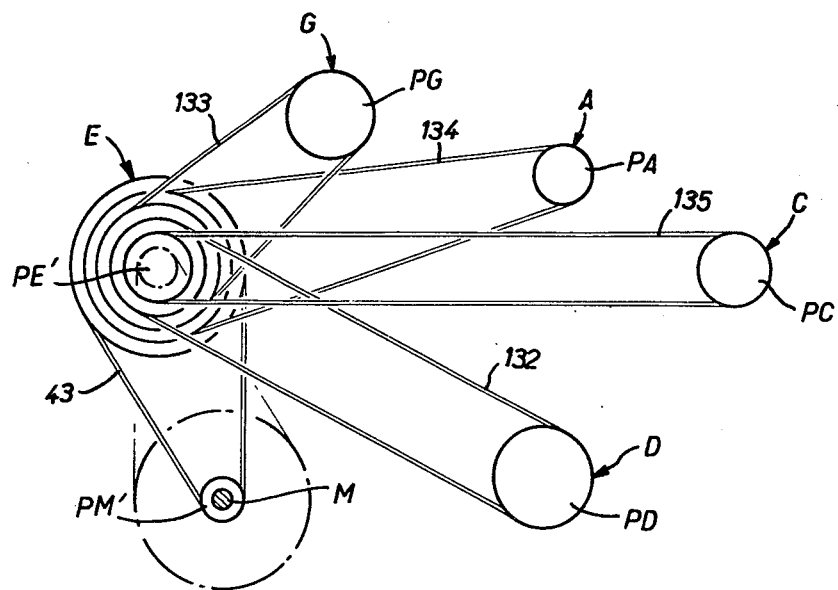

In the variant illustrated in FIG. 18, the arrangement is similar to that which is illustrated in FIG. 13, and comprises transmission means of variable ratio with the pulleys PM' and PE' with variable-spaced flanges and with individual belts for the drive of the various auxiliaries from the water pump E. The auxiliaries are however arranged round the water pump E in a different order.

In FIG. 13 the auxiliaries are arranged round the water pump E in the following order: C, G, A, D. In FIG. 18, this order is: G, A, C, D. Moreover, in FIG. 18 all the auxiliaries G, A, C, D are arranged on one and the same side of the plane passing through the axes of the pulleys PM' and PE'.

Figure 19:
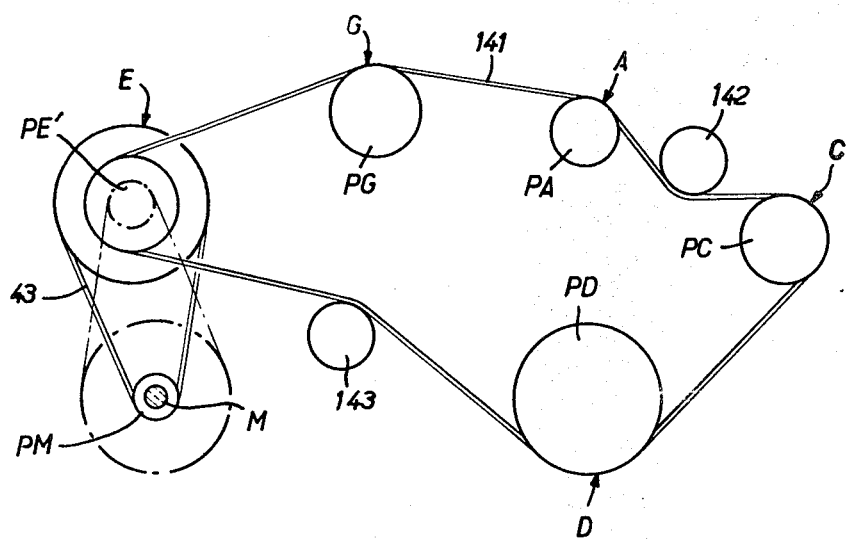

In the variant illustrated in FIG. 19, the water pump E is driven from the engine with a variable transmission ratio by virtue of the pulleys PM' and PE', the flanges of which are variable-spaced, and with the belt 43 of variable transmission ratio. All the auxiliaries G, A, C, D are driven through a single belt 141 from the pulley PE' of water pump E. Tension rollers are shown at 142 and 143. The auxiliaries are arranged round the water pump E in the following order: G, A, C and D.

I claim:

1. An engine-driven auxiliary system for a motor vehicle, comprising a vehicle engine, at least two auxiliaries which normally operate simultaneously, transmission means coupling said auxiliaries in rotation to said engine, said auxiliaries including a hierarchic group of auxiliaries with an order of operational priority in which at least one of the auxiliaries, referred to as the superior auxiliary, takes precedence over at least one other of the auxiliaries, referred to as the inferior auxiliary, further comprising at least one economiser element the state of which is variable concomitantly with the working conditions of the superior auxiliary, and which is adapted to put the inferior auxiliary at least partly out of action in response to the exceeding of a predetermined threshold in the working conditions of the superior auxiliary, so that the said transmission means are subjected to work which corresponds at most to a value lower than the sum of the maximum power consumption of the said auxiliaries, said superior auxiliary being an alternator, and an air-conditioning evaporator fan, said fan being adapted to be put into or out of action at the same time as the alternator is put into or out of action.

2. An engine-driven auxiliary system for a motor vehicle, comprising a vehicle engine, at least two auxiliaries which normally operate simultaneously, transmission means coupling said auxiliaries in rotation to said engine, said auxiliaries including a hierarchic group of auxiliaries with an order of operational priority in which at least one of the auxiliaries, referred to as the superior auxiliary, takes precedence over at least one other of the auxiliaries, referred to as the inferior auxiliary, further comprising at least one economiser element the stae of which is variable concomitantly with the working conditions of the superior auxiliary, and which is adapted to put the inferior auxiliary at least partly out of action in response to the exceeding of a predetermined threshold in the working conditions of the superior auxiliary, so that the said transmission means are subjected to work which corresponds at most to a value lower than the sum of the maximum power consumption of the said auxiliaries, said inferior auxiliary being a vehicle air-conditioning compressor, and an air-conditioning condenser fan, said fan being adapted to be put into or out of action at the same time as said vehicle air-conditioning compressor is put into or out of action.

3. An engine-driven auxiliary system for a motor vehicle, comprising a vehicle engine, at least two auxiliaries which normally operate simultaneously, transmission means coupling said auxiliaries in rotation to said engine, said auxiliaries including a hierarchic group of auxiliaries with an order of operational priority in which at least one of the auxiliaries, referred to as the superior auxiliary, takes precedence over at least one other of the auxiliaries, referred to as the inferior auxiliary, and further comprising at least one economiser element the state of which is variable concomitantly with the working conditions of the superior auxiliary, and which is adapted to put the inferior auxiliary at least partly out of action in response to the exceeding of a predetermined threshold in the working conditions of the superior auxiliary, so that the said transmission means are subjected to work which corresponds at most to a value lower than the sum of the maximum power consumption of the said auxiliaries, the transmission means comprising a driving pulley associated with the engine, a driven pulley associated with one of the auxiliaries, a belt passing round these pulleys, other pulleys associated with the other auxiliaries of the vehicle, and belt means passing round a pulley integral with the said driven pulley and round the other side pulleys, said driven pulley being associated with an auxiliary which does not form part of the said hierarchic group of auxiliaries.

4. A system according to claim 3, wherein said auxiliary with which the said driven pulley is associated is an engine cooling fluid circulating pump.

* * * * *